United States Patent [19]

Yazawa et al.

[11] Patent Number: 4,930,016
[45] Date of Patent: May 29, 1990

[54] IMAGE SCANNING READING AND RECORDING SYSTEM

[75] Inventors: Hiromi Yazawa; Masahiro Inoda; Hideaki Kimura, all of Kanagawa, Japan

[73] Assignee: Fuji Photo Film, Co., Ltd., Kanagawa, Japan

[21] Appl. No.: 376,186

[22] Filed: Jul. 6, 1989

Related U.S. Application Data

[63] Continuation of Ser. No. 39,195, Apr. 16, 1987, abandoned.

[30] Foreign Application Priority Data

Apr. 16, 1986 [JP] Japan .................................. 6187758

[51] Int. Cl.⁵ .............................................. H04N 1/21
[52] U.S. Cl. .................................... 358/296; 355/208
[58] Field of Search ........................... 355/6, 7, 40, 41; 358/296, 298, 300; 364/518

[56] References Cited

U.S. PATENT DOCUMENTS

| | | | |
|---|---|---|---|
| 3,343,142 | 9/1967 | Clark | 355/6 |
| 3,768,903 | 10/1973 | Steinberger | 355/41 |
| 4,609,283 | 9/1986 | Murata et al. | 355/6 |
| 4,680,646 | 7/1987 | Ikeda et al. | 358/298 |

FOREIGN PATENT DOCUMENTS

54-10004  4/1980  Japan .................................. 355/6

Primary Examiner—Gerald P. Tolin
Assistant Examiner—Lincoln Donovan
Attorney, Agent, or Firm—Sughrue, Mion, Zinn, Macpeak & Seas

[57] ABSTRACT

An image scanning reading and recording apparatus delivers an original bearing an image to a reading position, scans the original with a first light beam to read the image to produce image information, processes the image information according to prescribed image recording conditions to produce an image signal, modulates a second light beam with the image signal to produce a halftone dot signal, and applies the halftone dot signal to a photo-sensitive medium to record the image thereon. An original feeding mechanism is coupled to the image scanning reading and recording apparatus. The image scanning reading and recording apparatus includes a control unit connectable to an additional memory for storing image recording conditions for originals stored in the original feeding mechanism. The orginal feeding mechanism successively feeds the originals to the image scanning reading and recording apparatus, and identifies the originals as they are fed. The contol unit selects those of the image recording conditions stored in the additional memory which correspond to the orginal identified by the identifying means and records the image on the photosensitive medium according to the selected image recording conditions.

11 Claims, 5 Drawing Sheets

IMAGE SCANNING READING AND RECORDING SYSTEM

This is a continuation of application Ser. No. 07/039,195, filed Apr. 16, 1987, now abandoned.

BACKGROUND OF THE INVENTION

The present invention relates an image scanning reading and recording system, and more particularly to an image scanning reading and recording system for reading image information from originals such as photographs or line drawings which are successively supplied and for recording images on photosensitive materials such as photographic films according to image recording conditions that have been stored for the respective originals.

In the fields of printing and platemaking, there have been employed in recent years image scanning reading and recording apparatus for reading out image information on originals such as photographs or line drawings and processing the read-out image information to produce original film plates with a view to simplifying the printing and platemaking processes and improving image quality.

The image scanning reading and recording apparatus basically comprises an input unit, a control unit, and an output unit. In the input unit, a reflective photograph or line drawing original is scanned by a light beam and the reflected light is detected by a photo-multiplier or a similar light detector, or alternatively the image of the original is read out by a CCD (charge-coupled device) which converts the image information to electric signals representative of varying intensities of the reflected light. The input unit includes a keyboard for entering desired printing and platemaking conditions into the control unit. The image information which has photoelectrically been converted by the input unit is processed by the control unit for correcting gradations and breaking up the image into halftone dots, for example, according to the entered platemaking conditions. The processed image information is then converted by the output unit to an optical signal in the form of a laser beam, which is applied to a photosensitive medium such as a photographic film to record the desired image thereon. The photosensitive medium on which the image has been recorded is then subjected to a development process to produce an original film plate which will subsequently be used in a printing process.

It is preferable that the image scanning reading and recording apparatus of the above type be employed not only in the color printing field but also in the monochromatic printing area.

In view of the above demand, the applicant has developed a monochromatic scanner designed for improved efficiency and image quality. In order to obtain original film plates of desired performance in the above image scanning reading and recording apparatus, it is necessary to enter, through the keyboard, printing and platemaking conditions dependent on the condition of an original to be read or the printing method to be used. For example, gradations should be controlled dependent on whether the printing method is offset printing or letterpress printing or whether the paper is art paper or wood-free paper, and appropriate exposure control should be done by selecting a screen ruling, setting the density of an original, halftone dots, and a halftone dot ratio. It is also necessary to enter, through the input unit, various printing and plate-making conditions such as an image magnification or reduction ratio, image sharpness and intensity each time a film original is to be prepared.

Therefore, the input process for entering printing and platemaking conditions is quite complex, and a highly skilled operator is needed to enter such desired data items. When the operator is asked to process a number of originals, the operator first enters necessary data items on image recording conditions through the keyboard for the first original, which is then delivered into the input unit where the image is read from the original. In the output unit, the image information is recorded on a photosensitive medium according to the entered recording conditions to produce an original film plate. The same processing cycle will be repeated for processing the other originals.

While the originals are being read and the images are being recorded on photosensitive mediums, the operator is required to interact with the apparatus. It has been pointed out that the process of forming original film plates in the conventional image scanning reading and recording apparatus requires consistent skill on the part of the operator, or is of different efficiency from operator to operator.

SUMMARY OF THE INVENTION

It is a major object of the present invention to provide an image scanning reading and recording system which comprises an image scanning reading and recording apparatus and an automatic original feeding mechanism coupled thereto, the apparatus being arranged to allow a skilled operator to enter or set image recording conditions such as printing and platemaking conditions en bloc for a number of originals, so that the images of the originals fed automatically from the automatic original feeding mechanism can be recorded on photosensitive mediums according to the entered image recording conditions highly efficiently without the need of operator supervision.

It is an object of the present invention to provide a system for reading and recording an image by scanning the same, comprising: an image scanning reading and recording apparatus for delivering an original bearing an image to a reading position, scanning the original with a first light beam to read the image to produce image information, processing the image information according to prescribed image recording conditions to produce an image signal, modulating a second light beam with the image signal to produce a halftone dot signal, and applying the halftone dot signal to a photosensitive medium to record the image thereon; and an original feeding mechanism coupled to the image scanning reading and recording apparatus, the image scanning reading and recording apparatus including a control unit connectable to additional memory means for storing image recording conditions for originals stored in the original feeding mechanism, the original feeding mechanism including means for successively feeding the originals to the image scanning reading and recording apparatus and means for identifying the originals as they are fed, the control unit being arranged to select those of the image recording conditions stored in the additional memory means which correspond to the original identified by the identifying means and to record the image on the photosensitive medium according to the selected image recording conditions.

Another object of the present invention is to provide a system wherein the original feeding mechanism comprises a stacker for storing a stack of the originals, the stacker being displaceable by a rotative drive source, and feed means for selectively feeding the originals from the stacker to the image scanning reading and recording apparatus.

Still another object of the present invention is to provide a system wherein the feed means comprises a solenoid and a nip roller for catching an original selectively pushed out of the stacker in response to energization of the solenoid and delivering the original into the image scanning reading and recording apparatus.

Yet still another object of the present invention is to provide a system wherein the original feeding mechanism further includes a sprocket coupled to the rotative drive source, a chain trained around the sprocket, and a support base fixed to the chain, the stacker being positioned on the support base.

A further object of the present invention is to provide a system wherein the identifying means comprises photoelectric reader means for reading punched holes or a bar code on the original.

A still further object of the present invention is to provide a system wherein the original feeding mechanism comprises a casing having an opening which opens toward the image scanning reading and recording apparatus, a stacker disposed in the casing for storing a stack of the originals, a drive means for displacing the stacker along a guide member, selector means disposed on one side of the stacker for selecting an original from the stacker, detector means for confirming the selected original, and feed means disposed on the opposite side of the stacker for feeding the selected original through the opening of the casing to the image scanning reading and recording apparatus.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
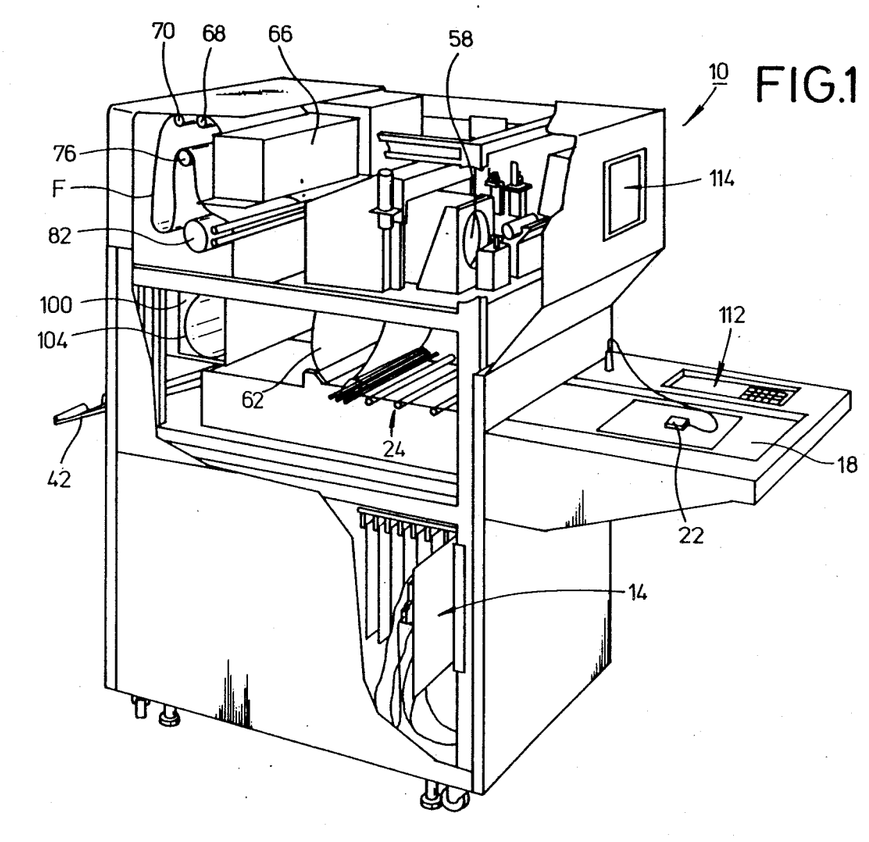
FIG. 1 is a perspective view, partly cut away, of an image scanning reading and recording apparatus according to the present invention.
Figure 2:
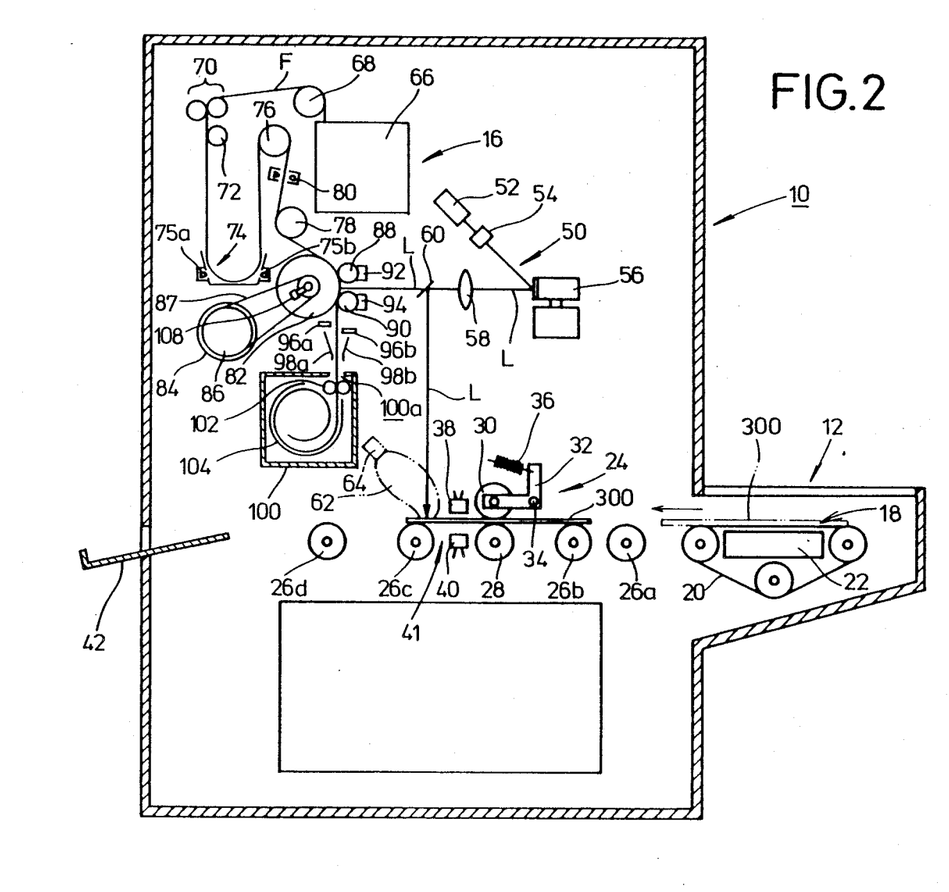
FIG. 2 is a schematic vertical cross-sectional view of the image scanning reading and recording apparatus shown in FIG. 1.

As shown in FIGS. 1 and 2, an image scanning reading and recording apparatus 10 basically comprises an input unit 12, a control unit 14, and an output unit 16.

The input unit 12 has an original supporting table 18, an endless conveyor belt 20 and a digitizer 22. An original delivery system 24 is positioned at one end of the conveyor belt 20. The original delivery system 24 includes a horizontal array of parallel rollers 26a, 26b, 26c, 26d with a drive roller 28 disposed between the rollers 26b, 26c. A nip roller 30 is disposed above the drive roller 28 and rotatably supported on a bent arm 32 swingably supported on a pivot 34 and coupled at one end to a coil spring 36. The arm 32 is normally urged by the coil spring 36 to turn about the pivot 34 in a direction to press the nip roller 30 toward the drive roller 28.

A light detecting assembly 41 comprising a light-emitting element 38 and a light detector 40 is disposed between the drive roller 28 and the roller 26c for detecting a carrier plate 300 as it is delivered by the rollers 26a through 26d and the drive and nip rollers 28, 30. An original receiving table 42 is positioned on one side of the roller 26d for receiving the carrier plate 300 which has been delivered from the original supporting table 18 via the rollers 26a through 26d.

The image scanning reading and recording apparatus 10 has an image reading system 50 positioned above the delivery system 24. The image reading system 50 includes a laser beam source 52 for generating a laser beam L that travels through a light modulator 54, a galvanometer mirror 56, a scanning lens 58, and a half-silvered mirror 60. A light guide 62 comprising a photoconductive sheet is positioned over an original where it is scanned by the laser beam L, the light guide 62 extending along a main scanning line on the original. An image sensor 64 such as a photomultiplier 64 is mounted on the upper end of the light guide 62. The laser beam L that has passed through the half-silvered mirror 60 reaches the output unit 16.

A photosensitive medium supply magazine 66 in the output unit 16 is mounted in an upper portion of a housing of the apparatus 10. The supply magazine 66 contains an elongate photosensitive medium such as a photographic film F. An outlet roller 68 for guiding the film F out of the supply magazine 16 is disposed substantially near the supply magazine 16. A pair of rollers 70 is located in one corner of the housing of the apparatus 10 in a position that is slightly lower than the roller 68. Downwardly of the rollers 70, there are situated a roller 72 and a loop detecting assembly 74 comprising a light-emitting element 75a and a light detector 75b for detecting the film F as it hangs loosely as a loop. The loop detecting assembly 74 is positioned below guide rollers 76, 78 between which there is disposed a tortuosity detector 80 for detecting the amount of tortuosity that the film F undergoes.

The guide roller 78 is positioned above a rotatable drum 82 which can be rotated by a belt 87 trained around the shaft thereof and a pulley 86 supported on the shaft of an image recording motor 84. The rotatable drum 82 has a central shaft supporting thereon a dog 108 which is angularly movable, upon rotation of the drum 82, into a position facing a photoelectric detector (not shown). The rotatable drum 87 is positioned in confronting relation to a pair of nip rollers 88, 90 which are movable toward and away from the drum 87 by means of respective solenoids 92, 94. Cutters 96a, 96b are located downwardly of the rotatable drum 82 and the nip rollers 90, and guide members 98a, 98b are disposed below the cutters 96a, 96b, respectively. The guide members 98a, 98b have lower ends directed toward an opening 100a of a photosensitive medium receiving magazine 100 in which a pair of rollers 102 and a curved guide member 104 are disposed below the opening 100a. The receiving magazine 100 can easily be taken out of the apparatus 10.

The input unit 12 also includes a keyboard unit 112 as shown in FIG. 1. The image scanning reading and recording apparatus 10 also has a CRT display unit 114 mounted on the housing over the input unit 12.

The image scanning reading and recording apparatus 10 is coupled to an automatic original feeding mechanism for automatically feeding image-bearing originals successively onto the original supporting table 18. The automatic original feeding mechanism is shown in detail in FIGS. 3 and 4.

Figure 3:
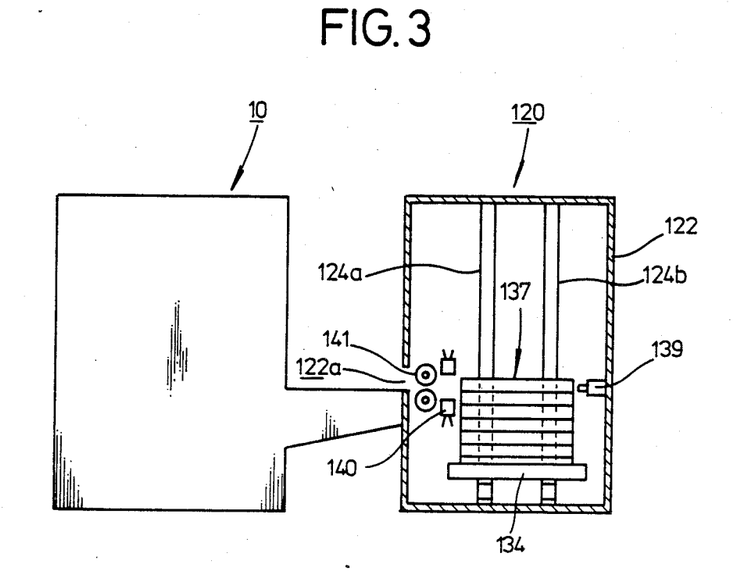
FIG. 3 is a side elevational view of the apparatus which is coupled to an automatic original feeding mechanism, shown in vertical cross section.
Figure 4:
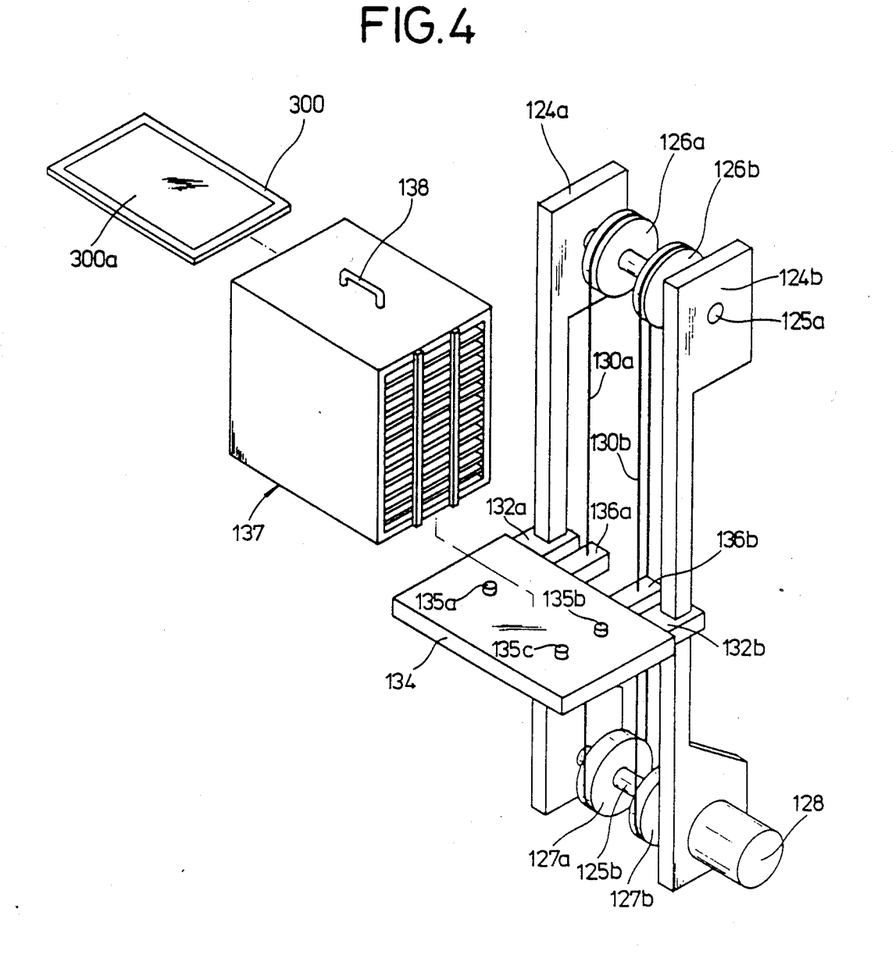
FIG. 4 is an enlarged exploded perspective view of the automatic original feeding mechanism.

As shown in FIG. 3, the automatic original feeding mechanism, generally indicated at 120, comprises a casing 122 for storing a stacker 137 having a vertical array of compartments which house a stack of carrier plates 300 with image-bearing originals 300a applied respectively thereto and guide members 124a, 124b disposed in the casing 122 and extending vertically in spaced-apart relation to each other. As illustrated in FIG. 4, shafts 125a, 125b are rotatably supported between the guide members 124a, 124b near their upper and lower ends, respectively. A pair of axially spaced sprockets 126a, 126b is supported on the upper shaft 125a. Another pair of axially spaced sprockets 127a, 127b is mounted on the shaft 125b, which is coaxially coupled to the drive shaft of a rotative drive source 128 such as a motor. A chain 130a is trained around the sprockets 126a, 127a, whereas a chain 130b is trained around the sprockets 126b, 127b. Sliders 132a, 132b are slidably fitted over the guide members 124a, 124b, respectively, and support thereon a support base 134 fixed thereto. The support base 134 has positioning pins 135a, 135b, 135c projecting upwardly. Arms 136a, 136b extend from one side of the support base 134 and are secured to the chains 130a, 130b, respectively.

The stacker 137 is placed on the support base 134 and positioned thereon by the positioning pins 135a, 135b, 135c. The stacker 137 has a grip handle 138 on its upper panel so that the stacker 137 can manually be carried around. The stacker 137 accommodates therein a stack of carrier plates 300 each carrying an image-bearing original 300a such as a colored photograph. Any one of the carrier plates 300 can be displaced, at a time, from the stacker 137 by a solenoid 139 (FIG. 3) attached to an inner surface of the casing 122. A photoelectric reader 140 is also disposed in the casing 122 adjacent to the stacker 137 for identifying the carrier plate 300 which is displaced from the stacker 137. More specifically, the photoelectric reader 140 identifies the original 300a on the carrier plate 300 displaced by the solenoid 139 to read an original number assigned to that original 300a. The original 300a may be identified by means of a series of coded punched holes defined in the original 300a itself or a bar code applied to the carrier plate 300, as well known in the art. A pair of nip rollers 141 is disposed in the casing 122 adjacent to the photoelectric reader 140 for delivering the carrier plate 300 from the stacker 137 through an opening 122a in the casing 122 into the image scanning reading and recording apparatus 10.

The control unit 14 and the keyboard unit 112 of the image scanning reading and recording apparatus 10 will be described below.

Figure 5:
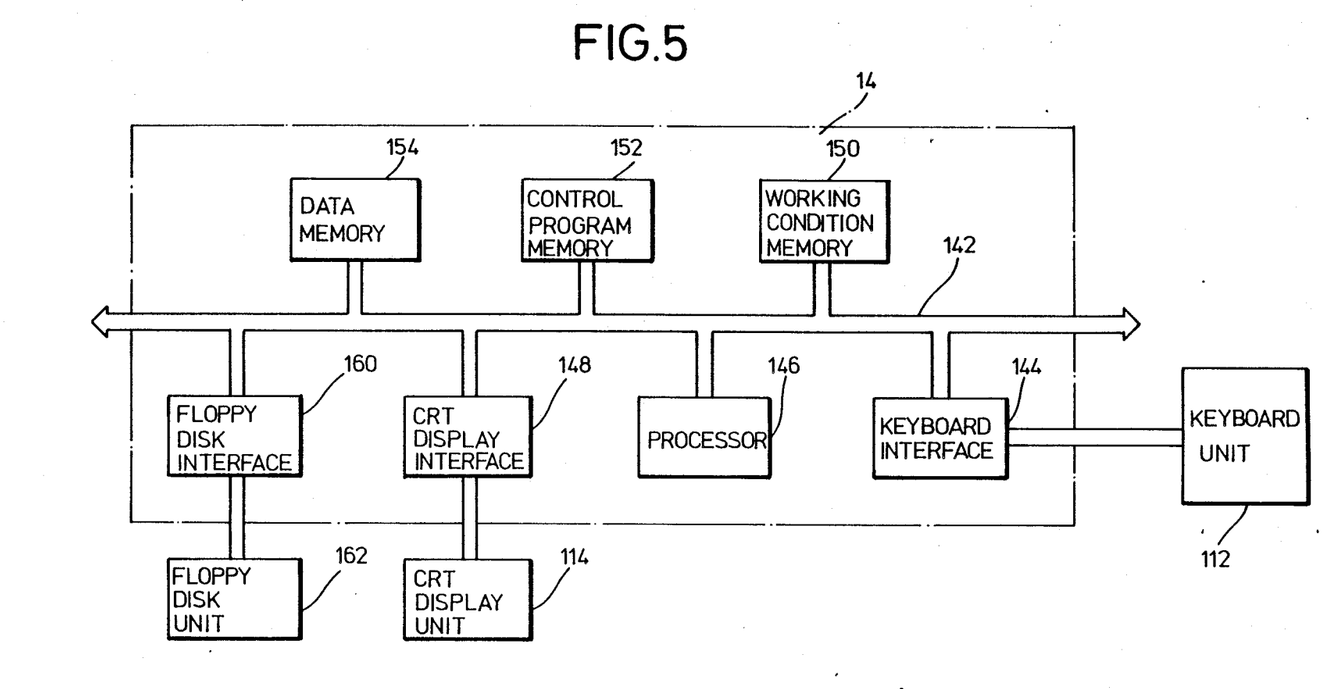
FIG. 5 is a block diagram of a control unit of the image scanning reading and recording apparatus.

As shown in FIG. 5, the control unit 14 comprises a microcomputer including a processor 146 for processing a read-out signal (an output signal from the photomultiplier 64 in FIG. 2) sent via a bus 142 according to a given processing sequence (program) stored in a control program memory 152 and for generating an output signal based on given image recording conditions such as printing and platemaking conditions to thereby modulate an image recording light beam.

In a printing process, gradations are generally expressed by the sizes of halftone dots. Therefore, it is necessary to appropriately process the read-out signal and apply the output signal to an image recording system by determining the sizes of halftone dots to be applied for highlights and shadows on the original. Therefore, in order to obtain an original film plate, it is necessary to enter, into the control unit 14, various printing and platemaking conditions (image recording conditions) such as a gradation curve, a screen ruling, an original density, and a halftone dot ratio dependent on whether the printing method is offset printing or letterpress printing or whether the paper is art paper or wood-free paper, and an image magnification or reduction ratio, image sharpness and intensity.

In the image scanning reading and recording apparatus 10 according to the present invention, such various data items regarding the image recording conditions can be entered through the keyboard unit 112 and the CRT display unit 114 (FIG. 1) on an interactive basis. More specifically, the control unit 14 also includes a data memory 154 for storing various data items which have been prepared in advance as described above. The stored data items are selectively displayed through a CRT display interface 148 on the CRT display unit 114 according to a control sequence (program) stored in the control program memory 152. By referring to the displayed data, the operator can enter required conditions through the keyboard unit 112. For example, eight gradation curves are stored as data items in the data memory 154. The operator pushes a gradation curve key on the keyboard unit 112 and then selectively pushes one of keys "1" through "8" on a ten-key pad for entering a desired gradation curve.

An input signal from the keyboard unit 112 is stored through a keyboard interface 144 into a working condition memory 150. The processor 146 processes the read-out signal according to the processing sequence stored in the control program memory 152 by referring to the gradation curve which has been entered and stored in the working condition memory 150 for applying an appropriate output signal to the image recording system to produce a desired original film plate.

The various printing and platemaking conditions, as mentioned above, are entered in the same manner as the above gradation curves. After all conditions have been stored in the working condition memory 150, a start button on the keyboard unit 112 is depressed to feed an original, operate the image reading system 50, process a read-out signal, and operate the image recording system according to the processing sequence stored in the control program memory 152 for producing an original film plate.

The control unit 14 also includes a floppy disk interface 160 connected to a floppy disk unit 162 which functions as an additional memory. The floppy disk unit 162 has a floppy disk as a storage medium (not shown) for storing printing and platemaking conditions with respect to an original supplied from the original feeding mechanism 120 into the image scanning reading and recording apparatus 10 (i.e., an original 300a carried on a carrier plate 300 accommodated in the stacker 137). The printing and platemaking conditions for a certain original may be stored in the floppy disk in a general manner, i.e., they may be associated with an address represented by an identification code of that original, e.g., its number.

The above conditions can be stored through a dedicated input machine (not shown) using a microcomputer which is basically of the same construction as that shown in FIG 5. The control sequence stored in the control program memory 152 includes a sequence (floppy disk input mode) for storing the printing and platemaking conditions into the floppy disk unit 162. Specifically, based on the interactive process employing the CRT display unit 114 and the keyboard unit 112, the identification number of a certain original can be entered as address information through the ten-key pad on the keyboard unit 112 into the floppy disk unit 162, and printing and platemaking conditions such as a selected gradation curve can be entered successively through the keyboard unit 112.

The condition input process for entering printing and platemaking conditions into the working condition memory 150 is effected in a manual mode (which is different from the automatic mode for processing readout signals in the control unit of FIG. 5). In the manual mode, the printing and platemaking conditions entered from the keyboard unit 112 are successively stored into the working condition memory 150. In the floppy disk input mode, however, the entered printing and platemaking conditions are sent to the floppy disk unit 162 where they are successively stored in the floppy disk at storage locations assigned to the original identification numbers, respectively.

A plurality of originals can automatically be processed without the need of operator supervision by setting a floppy disk storing printing and platemaking conditions for those originals into the floppy disk unit 162 and connecting the automatic original feeding mechanism 120 to the image scanning reading and recording apparatus 10.

The image scanning reading and recording apparatus 10 thus constructed operates as follows:

The apparatus 10 is in an automatic original feeding mode in which originals 300a can automatically be fed from the original feeding mechanism 120 coupled to the apparatus 10, and a floppy disk storing printing and platemaking conditions for originals stored in the original feeding mechanism 120 is set into the floppy disk unit 162, thus making the apparatus 10 ready to start. The motor 128 is energized to elevate the support table 134 through the chains 130a, 130b. The stacker 137 is moved upwardly until the uppermost carrier plate 300 is horizontally aligned with the solenoid 139, which is then energized to displace the carrier plate 300 toward the nip rollers 141. The nip rollers 141 are rotated to feed the carrier plate 300 with the original 300a thereon from the original feeding mechanism 120 into the image scanning reading and recording apparatus 10. At this time, the identification number of the original 300a is detected by the photoelectric reader 140 and transmitted to the control unit 14. The original identification number is sent through the floppy disk interface 160 to the floppy disk unit 162 according to the control sequence stored in the control program memory 152 for reading the printing and platemaking conditions corresponding to the original identification number out of the floppy disk. The read-out printing and platemaking conditions are delivered to and stored in the working condition memory 150.

Upon completion of the processing of the original 300a fed to the apparatus 10, the stacker 137 in the original feeding mechanism 120 is elevated again a given pitch or interval to supply the next original 300a from the original feeding mechanism 120 into the apparatus 10. The original identification number is detected by the photoelectric electric reader 140 and sent to the control unit 14 for reading corresponding printing and platemaking conditions from the floppy disk unit 162. The originals 300a stored in the stacker 137 are successively processed automatically in the above manner.

If the printing and platemaking conditions for an original 300a fed from the original feeding mechanism 120 are not available in the floppy disk unit 162, or if an error is present due to erroneous setting of printing and platemaking conditions, then a suitable error process is effected as by returning the original back to its compartment in the stacker 137. A similar error process is carried out also when two originals are placed into one compartment in the stacker 137 by the operator. If a compartment in the stacker 137 contains no original and hence no original is displaced from that compartment by the solenoid 139, the compartment is skipped and the stacker 137 is moved upwardly again until the next original is reached. Where the control unit 14 is supplied with information as to whether compartments below a particular compartment contain originals or not, the control unit 14 can control the original feeding mechanism 120 to lower the stacker 137 back to its starting position when the original from the particular compartment has been processed.

When a certain carrier plate 300 is fed into the apparatus 10 and positioned on the original supporting table 18, the conveyor belt 20 is driven to move the carrier plate 300 from the original supporting table 18 in the direction of the arrow A (FIG. 1) into the delivery system 24. In the delivery system 24, a stepping motor (not shown) is energized to rotate the drive roller 28 to deliver the carrier plate 300 in the direction of the arrow A on the rollers 26a, 26b, the drive roller 28, and the rollers 26c, 26d. During this time, the nip roller 30 presses the carrier plate 300 against the drive roller 28 to continuously move the carrier plate 300 stably with respect to the light guide 62.

The light detecting assembly 41 detects arrival of the carrier plate 300 and applies a signal to the control unit 14, which feeds a drive signal to the output unit 16. More specifically, when a starting mark (not shown) on the carrier plate 300 reaches a position between the light-emitting element 38 and the light detector 40, the light detecting assembly 41 supplies the control unit 14 with a signal indicating that the original 300a applied to the carrier plate 300 has arrived at an image reading position, whereupon the control unit 14 drives the output unit 16. The output unit 16 then delivers the film F from the supply magazine 66 toward the receiving magazine 100. The film F supplied from the supply magazine 66 is fed through the roller 68, the roller pair 70, the guide rollers 72, 76, 78 to the drum 82. The light-emitting element 75a of the loop detector 74 emits a light beam of such a wavelength to which the film F is insensitive, and the light detector 75b detects such a light beam. The loop detector 74 detects when the film F forms a prescribed hanging loop. The tortuosity detector 80 comprises a light-emitting element for emitting a light beam of a wavelength to which the film F is insensitive, and a light detector for detecting a light beam from the light-emitting element The light-emitting element and the light detector are positioned one on each side of the path of the film F, outside of a tortuous zone in which the film F is allowed to be tortuous. When the film F becomes bent, twisted or otherwise tortuous out of the allowed tortuous zone, the tortuosity detector 80 produces a tortuosity signal to control the rate at which the film F flows out of the supply magazine 66.

Then, the output unit 16 energizes the motor 84 to rotate the belt 87 and hence the drum 82. The dog 108 is also angularly moved into confronting relation to the photoelectric detector, whereupon the latter generates an output signal to temporarily stop the drum 82. At the same time, the solenoids 92, 94 are energized to press the nip roller 88, 90 against the drum 82 with the film F sandwiched therebetween, whereupon the drum 82 is rotated again to start feeding the film F toward the receiving magazine 100.

The laser beam L emitted from the laser beam source 52 passes through the light modulator 54 and is deflected by the galvanometer mirror 56 while passing through the scanning lens 58 to the half-silvered mirror 60. The light beam reflected by the half-silvered mirror 60 scans the original on the carrier plate 300 while the light beam is being deflected. Light reflected from the original enters the light guide 62 and then is converted by the photomultiplier 64 to an electric signal, which is supplied to the control unit 14 where it is corrected for gradations according to the printing and platemaking conditions.

The image of the original is recorded on the film F in the output unit 16 based on the image signal with the gradations corrected by the control unit 14. More specifically, the laser beam L modulated by the image signal scans the film F through the gap between the nip rollers 80, 90. The film F is thus continuously scanned by the laser beam L. The completion of image recording is detected when a bar code (not shown), for example, applied to the carrier plate 300 is read by the light detecting assembly 41.

The laser beam L reflected by the half-silvered mirror 60 and applied to the original for reading the image on the original and the laser beam L passing through the half-silvered mirror 60 and applied to the film F for recording the image on the film F are alternately generated on a time-division principle to read and record the image on alternate scanning lines, for example. More specifically, the image signal from the photomultiplier 64 for one scanning line on the image is stored in a line buffer, for example, and then the laser beam L from the laser beam source 52 is modulated by the image signal stored in the line buffer to record the image on the film F for that scanning line. This multiplex reading and recording process is repeated until the image is read and recorded for the entire scanning lines.

The film F with the image recorded thereon is cut off by the cutters 96a, 96b moving toward each other. The cut piece of the film F is guided by the guide members 98a, 98b into the receiving magazine 100. The film pieces thus stored in the receiving magazine 100 are thereafter taken out as required for a photomechanical process.

With the arrangement of the present invention, as described above, the image scanning reading and recording apparatus is connected to the automatic original feeding mechanism and the additional memory which stores image recording conditions such as printing and platemaking conditions for a plurality of originals that will be successively fed from the automatic original feeding mechanism. Therefore, the originals can automatically be processed successively without operator supervision.

The efficiency of entering the image recording conditions into the image scanning reading and recording apparatus is greatly improved since they can be entered by one operator through a dedicated input machine.

In the above embodiment, the floppy disk unit 162 is employed as the additional memory. However, a magnetic tape cassette unit or a magnetic bubble cassette unit may also be used as the additional memory. Alternatively, a magnetic tape strip may be applied to a base for an original for storing image recording conditions, and a read/write unit may be used for reading the image recording conditions from such a magnetic tape strip.

Although a certain preferred embodiment has been shown and described, it should be understood that many changes and modifications may be made therein without departing from the scope of the appended claims.

What is claimed is:

1. A system for reading and recording an image by scanning the same, comprising:
    entry means for allowing, prior to scanning and recording processing of a plurality of respective single-sheet originals, entry, for each respective single-sheet original, of predetermined image recording conditions, and identifying information affixed in physical relation with the respective single-sheet original, and for associating said predetermined image recording conditions for each respective single-sheet original with its identifying information;
    an image scanning reading and recording apparatus for
        delivering selected ones of said single-sheet originals bearing an image and identifying information to a reading position,
        scanning a selected one of said single-sheet originals with a first light beam to read the image to produce image information,
        processing the image information according to said predetermined image recording conditions to produce an image signal,
        modulating a second light beam with the image signal to produce a halftone dot signal, and
        applying the halftone dot signal to a photosensitive medium to record the image thereon; and including
        control unit means including primary memory means for storing data items used to produce the image signal, said control unit means being connectable to additional memory means for storing said predetermined image recording conditions in association with identifying information for each respective single-sheet original; and
    original feeding mechanism means including means for successively feeding selected ones of said single-sheet originals to said image scanning reading and recording apparatus and identifying means for identifying each selected single-sheet original as it is fed based on identifying information located on said selected single-sheet original, said control unit means being arranged to select those of said predetermined image recording conditions stored in said additional memory means which correspond to said selected single-sheet original identified by said identifying means on the basis of said identifying information, and to effect the recording of the image on said photosensitive medium according to selected said predetermined image recording conditions.

2. A system according to claim 1, wherein said original feeding mechanism means comprises a stacker for storing a stack of said single-sheet originals, said stacker being displaceable by a rotative drive source, and feed means for selectively feeding selected said single-sheet originals from said stacker to said image scanning reading and recording apparatus.

3. A system according to claim 2, wherein said feed means comprises a solenoid and a nip roller for catching a single-sheet original selectively pushed out of said stacker in response to energization of said solenoid and delivering the selected said single-sheet original into said image scanning reading and recording apparatus.

4. A system according to claim 2, wherein said original feeding mechanism means further includes a sprocket coupled to said rotative drive source, a chain trained around said sprocket, and a support base fixed to said chain, said stacker being positioned on said support base.

5. A system according to claim 1, wherein said identifying means comprises photoelectric reader means for reading punched holes or a bar code corresponding to said identifying information on the original.

6. A system according to claim 1, wherein said original feeding mechanism means comprises a casing having an opening which opens toward said image scanning reading and recording apparatus, a stacker disposed in said casing for storing a stack of said single-sheet originals, a drive means for displacing said stacker along a guide member, selector means disposed on said stacker for selecting a single-sheet original from said stacker, detector means for confirming the selected single-sheet original, and feed means disposed on the opposite side of said stacker for feeding the selected single-sheet original through said opening of the casing to said image scanning reading and recording apparatus.

7. A system for reading and recording an image by scanning the same, comprising:

entry means for allowing, prior to scanning and recording processing of a plurality of respective single-sheet originals, entry, for each respective single-sheet original, of predetermined image recording conditions, and identifying information affixed in physical relation with the respective single-sheet original, and for associating said predetermined image recording conditions for each respective single-sheet original with its identifying information;

an image scanning reading and recording apparatus for delivering selected ones of said single-sheet originals bearing an image and identifying information to a reading position, scanning a selected one of said single-sheet original with a first light beam to read the image to produce image information, processing the image information according to said predetermined image recording conditions to produce an image signal, modulating a second light beam with the image signal to produce a halftone dot signal, and applying the halftone dot signal to a photosensitive medium to record the image thereon; and including control unit means having primary memory means for storing data items used to produce the image signal, said control unit means being connected to additional memory means for storing said predetermined image recording conditions in association with identifying information for each respective single-sheet original; and original feeding mechanism means comprising a casing, a stacker disposed in said casing for storing a stack of single-sheet originals, drive means for displacing said stacker, selector means for selecting one of said single-sheet originals from said stacker, and feed means for feeding the selected single-sheet original through said image scanning reading and recording apparatus, wherein said control unit is adapted for selecting those of said predetermined image recording conditions stored in said additional memory means which correspond to the single-sheet original selected as identified by the identifying information affixed in physical relation therewith, and for controlling recording of the image on said photosensitive medium according to the selected predetermined image recording conditions.

8. A system according to claim 7, said system further comprising means for confirming said identifying information of the selected single-sheet original.

9. A system according to claim 7, wherein said feed means comprises a solenoid and a nip roller for catching a single-sheet original selectively pushed out of said stacker in response to energization of said solenoid and delivering said single-sheet original into said image scanning reading and recording apparatus.

10. A system according to claim 7, wherein said original feeding mechanism means further includes a sprocket coupled to said rotative drive source, a chain trained around said sprocket, and a support base fixed to said chain, said stacker being positioned on said support base.

11. A system according to claim 7, comprising identifying means including photoelectric reader means for reading punched holes or a bar code corresponding to said identifying information on the original.

* * * * *